US012775808B2

(12) United States Patent
Lee et al.

(10) Patent No.: US 12,775,808 B2
(45) Date of Patent: Oct. 27, 2026

(54) TASK-ORIENTED ASSISTANT USING LANGUAGE MODELS

(71) Applicant: NVIDIA Corporation, Santa Clara, CA (US)

(72) Inventors: Yi-Hui Lee, Farmers Branch, TX (US); Oluwatobi Olabiyi, Falls Church, VA (US); Pritam Biswas, San Jose, CA (US); Zhilin Wang, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 202 days.

(21) Appl. No.: 18/581,530

(22) Filed: Feb. 20, 2024

(65) Prior Publication Data

US 2025/0265422 A1 Aug. 21, 2025

(51) Int. Cl.
*G06F 40/40* (2020.01)
*G06F 40/284* (2020.01)

(52) U.S. Cl.
CPC ............ *G06F 40/40* (2020.01); *G06F 40/284* (2020.01)

(58) Field of Classification Search
CPC ......... G06F 40/40; G06F 40/284; G06F 40/35
See application file for complete search history.

(56) References Cited

U.S. PATENT DOCUMENTS

2023/0186033 A1* 6/2023 Rastogi .................. G06F 3/167 704/9
2024/0062108 A1* 2/2024 Pham .................... G06F 40/295
2024/0221731 A1* 7/2024 Gupta ................... G10L 15/063
2024/0404514 A1* 12/2024 Rollwage ............... G16H 50/20
2025/0053748 A1* 2/2025 Fayyaz ................... G06F 40/35
2025/0124620 A1* 4/2025 Arora ...................... G06T 11/26

OTHER PUBLICATIONS

Hudeek, V., & Duek, O. (2023). Are LLMs all you need for task-oriented dialogue?. arXiv preprint arXiv:2304.06556. (Year: 2023).*
Bocklisch, T., Werkmeister, T., Varshneya, D., & Nichol, A. (2024). Task-oriented dialogue with in-context learning. arXiv preprint arXiv:2402.12234. (Year: 2024).*
Dhamani, D., & Maher, M. L. (2023). The tyranny of possibilities in the design of task-oriented LLM systems: A scoping survey. arXiv preprint arXiv:2312.17601. (Year: 2023).*
(Continued)

*Primary Examiner* — Philip H Lam
(74) *Attorney, Agent, or Firm* — Lowenstein Sandler LLP

(57) ABSTRACT

Disclosed are systems and techniques that may generate task-oriented assistant responses to natural language requests of a user. The techniques include receiving a natural language request of a user and generating a task-oriented assistant response based on the natural language request. Generating the task-oriented assistant response includes converting the natural language request into a first set of tokens using a first machine learning model, applying a large language model (LLM) to the first set of tokens to obtain dialogue state information, modifying the dialogue state information using system state information, and determining a natural language response using the LLM and the modified dialogue state information, where the natural language response is the task-oriented response.

19 Claims, 10 Drawing Sheets

(56) References Cited

OTHER PUBLICATIONS

Hosseini-Asl, E., McCann, B., Wu, C. S., Yavuz, S., & Socher, R. (2020). A simple language model for task-oriented dialogue. Advances in Neural Information Processing Systems, 33, 20179-20191. (Year: 2020).*

Budzianowski, P., & Vulić, I. (2019). Hello, it's GPT-2—how can I help you? towards the use of pretrained language models for task-oriented dialogue systems. arXiv preprint arXiv:1907.05774. (Year: 2019).*

Budzianowski, et al., "MultiWOZ—A Large-Scale Multi-DomainWizard-of-Oz Dataset for Task-Oriented Dialogue Modelling," arXiv:1810.00278v3 [cs.CL] Apr. 20, 2020, 14 pages.

Chen, et al., "Action-Based Conversations Dataset: A Corpus for Building More In-Depth Task-Oriented Dialogue Systems," arXiv:2104.00783v1 [cs.CL] Apr. 1, 2021, 16 pages.

Zhang, et al., "DialogStudio: Towards Richest and Most Diverse Unified Dataset Collection for Conversational AI," arXiv:2307.10172v2 [cs.CL] Jul. 20, 2023, 17 pages.

* cited by examiner

TASK-ORIENTED ASSISTANT USING LANGUAGE MODELS

TECHNICAL FIELD

At least one embodiment pertains to a system for training a machine learning model that will cause a language model to provide task-oriented responses to a user.

BACKGROUND

Generative artificial intelligence (AI) models may include machine learning models that have been trained to predict an output—such as text, audio, images, 3D models, etc. —based on processing a given input prompt. Some generative AI models are language models that receive an input text and output a generated text. Some language models (e.g., large language models (LLMs)) are large in size (e.g., billions of parameters) and are trained using large amounts of data, which allow the model to appropriately respond to a large variety of input prompts. In some cases, the LLM is finetuned after training on the large amount of data to improve the accuracy of the LLM regarding one or more specific tasks. In some cases, the LLM is not modified, and another machine learning model is trained to generate inputs for the LLM that guide the LLM output.

DETAILED DESCRIPTION

Figure 1:
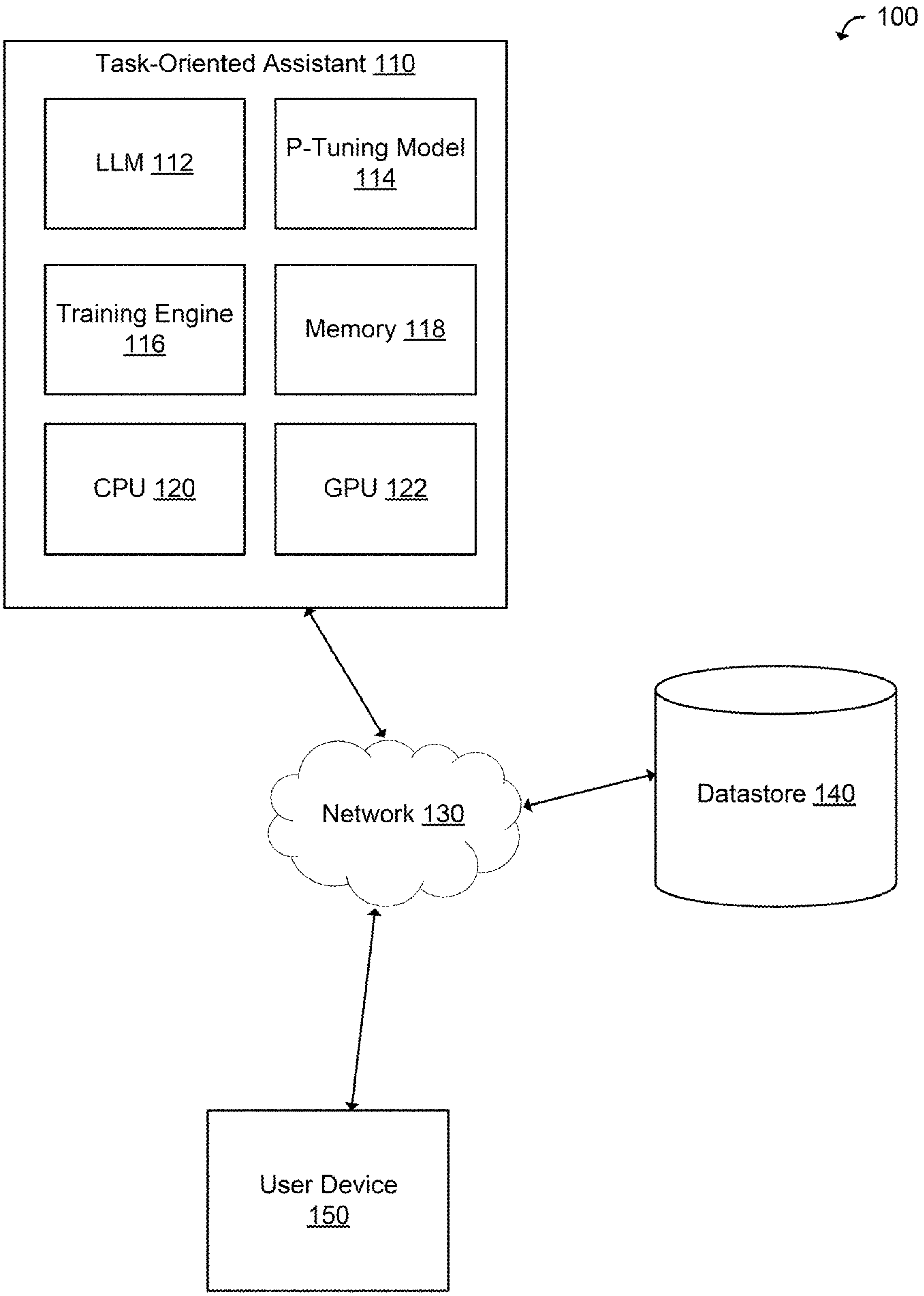
FIG. 1 is a block diagram of an example computer system that uses machine learning models to guide an LLM to respond to user requests as a task-oriented assistant, according to at least one embodiment.

Task-oriented assistants need to be able to understand a user's request and often need to access data outside of the data the assistant was trained on. Task-oriented assistants are often implemented using a plurality of machine learning models. For example, a first model might identify the intent of a user's request (e.g., the desired outcome of the user's request, such as finding a restaurant, booking an appointment, looking up music, etc.), a second model might identify slots and/or slot types (e.g., parameters and parameter types related to the user's intent, such as a city where the restaurant is located, the name of a business with which to book an appointment, the artist associated with the music to look up, etc.) in the user's request, a third model might identify slot values (e.g., parameter values matching the slots and/or slot types, such as San Jose, Automotive Services Inc., Michael Jackson, etc.) in the user's request, and a fourth model that might generate a response. In some cases, the first machine learning model is a classification model that identifies the user's intent by classifying the user's request into one of a set of intent classifications. In some cases, the fourth model is a sequence-to-sequence model that generates an output text (e.g., output sequence) based on a combination of the user's request, identified slots, and identified slot values (e.g., input sequence).

Based on the user's intent, the slot(s) identified in the user's request, and the slot value(s), data might be accessed to supplement the assistant's response. For example, the task-oriented assistant might have access to the user's contact list, todo list, calendar, and/or notes, the weather forecast, location information related to the user, etc. Based on the user's request, the task-oriented assistant can provide a response based on the data available to the assistant. However, using such machine learning models can lead to poor results and limited usefulness in real-world scenarios. For example, the classification model that identifies a user's intent may only be trained on a few intents (e.g., finding a restaurant and booking an appointment) and may not be able to generalize to new intents (e.g., looking up music, modifying a todo list, etc.). Similarly, the sequence-to-sequence model may not generalize well to novel combinations of user requests and user data (e.g., combinations of user requests and user data that were not included in the sequence-to-sequence model training data).

Aspects and embodiments of the present disclosure address these and other technological challenges by using a p-tuning model to guide a (e.g., large) language model to respond to user requests as a task-oriented assistant. The p-tuning model may be a machine learning model (e.g., a long short-term memory (LSTM) model, a recurrent neural network (RNN), a language model, etc.). The p-tuning model may receive as an input a first prompt that includes the user's request and may output a first set of tokens (e.g., values within an embedding space) that are used as input for a large language model (LLM). The output of the LLM may include structured data (e.g., dialogue state information) identifying an intent of the user (e.g., a desired action to be performed) and one or more slot types (e.g., parameter types associated with the desired action) and associated slot values (e.g., parameter values associated with the desired action). The dialogue state information may be provided as input to a data access system, which may access data based on the identified action of the dialogue state information and the one or more slot types and corresponding values. For example, the dialogue state information may indicate that the user is looking for a restaurant (e.g., action) in the city (e.g., slot/slot type) San Jose (e.g., slot value). The data access system may add one or more system slot types and corresponding values to the dialogue state information to create modified dialogue state information. The one or more system slot types and corresponding values of the modified dialogue state information may improve the relevance and helpfulness of the task-oriented assistant's response. For example, based on preferences previously indicated by the user, the data access system may add a "cuisine" slot to the dialogue state information with a corresponding slot value of "Mexican" to obtain the modified dialogue state information. The modified dialogue state information may be used to generate a second prompt for the p-tuning model (e.g., the second prompt may include the modified dialogue state information).

The second prompt may be provided to the p-tuning model, which may generate a second set of tokens (e.g., values within an embedding space). The second set of tokens may be provided as an input to the LLM. In some embodiments, the modified dialogue state information is also provided as an input to the LLM. The output of the LLM (e.g., second output) may be a natural language response (e.g., from the task-oriented assistant) that responds to the user's request.

The advantages of the disclosed techniques include but are not limited to using fewer machine learning models, and therefore fewer computing resources (e.g., processing time, storage space, etc.), than alternative task-oriented assistant implementations.

System Architecture

FIG. 1 is a block diagram of an example computer system 100 that uses machine learning models (e.g., p-tuning model 114) to guide an LLM (e.g., LLM 112) to respond to user requests as a task-oriented assistant, according to at least one embodiment. As depicted in FIG. 1, a computer system 100 may include a task-oriented assistant 110, datastore 140, and user device 150 connected to a network(s) 130. Network(s) 130 may be a public network (e.g., the Internet), a private network (e.g., a local area network (LAN), or wide area network (WAN)), a wireless network, a personal area network (PAN), another network type, and/or a combination thereof.

Task-oriented assistant 110 may include a desktop computer, a laptop computer, a smartphone, a tablet computer, a server, a wearable device, a virtual reality (VR)/augmented reality (AR)/mixed reality (MR) headset or heads up display, a digital avatar or chat bot kiosk, an in-vehicle infotainment computing device, and/or any suitable computing device capable of performing the techniques described herein. Task-oriented assistant 110 may include LLM 112, p-tuning model 114, and training engine 116. In some embodiments, LLM 112 and/or p-tuning model 114 may be a deployed machine learning model. LLM 112 may include any language model capable of text completion (e.g., GPT, BERT, RoBERTa, etc.). P-tuning model 114 may include a long short-term memory (LSTM) machine learning mode, a recurrent neural network (RNN) machine learning model, a language model, and/or another machine learning model. Training engine 116 may modify learnable weights of one or more machine learning models (e.g., LLM 112, p-tuning model 114) to improve an accuracy of the model (e.g., to minimize the value of a loss function associated with the machine learning model).

Task-oriented assistant 110 may be configured to receive a natural language request from a user (e.g., from user device 150 via network(s) 130). The natural language request may be provided to p-tuning model 114 to obtain a first set of tokens (e.g., a first tokenized representation of the natural language request). The first set of tokens may be provided to LLM 112 to obtain a first LLM output, the first LLM output representing dialogue state information. The dialogue state information may be provided to another system (not shown) to obtain modified dialogue state information. The modified dialogue state information may be provided to p-tuning model 114 to obtain a second set of tokens. The second set of tokens may be provided to LLM 112 to obtain a second LLM output, the second LLM output representing the task-oriented assistant natural language response to the natural language request.

Datastore 140 may include a persistent storage capable of storing natural language requests, natural language responses, dialogue state information, modified dialogue state information, prompt templates, machine learning models and/or machine learning model parameters, and the like. Datastore 140 may be hosted by one or more storage devices, such as main memory, magnetic or optical storage disks, tapes, or hard drives, network-attached storage (NAS), storage area network (SAN), and so forth. Although depicted as separate from task-oriented assistant 110, in at least some embodiments, datastore 140 may be a part of task-oriented assistant 110. In at least some embodiments, datastore 140 may be a network-attached file server, while in other embodiments datastore 140 may be some other type of persistent storage such as an object-oriented database, a relational database, and so forth, that may be hosted by a server machine or one or more different machines coupled to the task-oriented assistant via network(s) 130.

User device 150 may include a desktop computer, a laptop computer, a smartphone, a tablet computer, a server, a wearable device, a virtual reality (VR)/augmented reality (AR)/mixed reality (MR) headset or heads up display, a digital avatar or chat bot kiosk (e.g., a talking kiosk), an in-vehicle infotainment computing device, and/or any suitable computing device capable of performing the techniques described herein. User device 150 may interact with task-oriented assistant 110 (e.g., via network(s) 130) and may provide a natural language request to task-oriented assistant 110. For example, a user may submit a natural language request to task-oriented assistant 110 by using user device 150. Task-oriented assistant 110 may generate a task-oriented natural language response to the natural language request.

In some embodiments, task-oriented assistant 110 may include a memory 118 communicatively coupled with one or more processing devices, such as one or more GPUs 122 and one or more CPUs 120. The memory may store one or more codes, such as LLM 112, p-tuning model 114, and/or training engine 116. Any or all of LLM 112, p-tuning model 114, and/or training engine 116 may be executed using GPU(s) 122, CPU(s) 120, and/or another processing unit type (e.g., an accelerator, such as a deep learning accelerator (DLA)).

In at least one embodiment, LLM 112 and/or p-tuning model 114 may be implemented as deep learning neural networks having multiple levels of linear or non-linear operations. For example, LLM 112 and/or p-tuning model 114 may include convolutional neural layers, recurrent neural layers, fully connected neural networks, neural networks with memory layers/subnetworks, and/or so on. In at least one embodiment, LLM 112 and/or p-tuning model 114 may include multiple neurons, where one or more individual neurons may receive its input from one or more other neurons and/or from an external source, and may produce an output by applying an activation function to the sum of weighted inputs and a bias value. In at least one embodiment, LLM 112 and/or p-tuning model 114 may include multiple neurons arranged in layers, including an input layer, one or more hidden layers, and/or an output layer. In embodiments, neurons from adjacent layers may be connected by weighted edges.

Training engine 116 may identify parameters (e.g., neural weights, biases, parameters of activation functions, etc.) of p-tuning model 114 that maximize success of task-oriented assistant 110. In some embodiments, training of p-tuning model 114 may be supervised, e.g., using human-annotations of dialogue state information as ground truth and/or using human-annotations of natural language response(s) as ground truth. In other embodiments, training of p-tuning model 114 may be unsupervised.

Initially, learnable parameters (e.g., edge weights and biases) of p-tuning model 114 may be assigned some starting (e.g., random) values. For every training input (e.g., user utterance and ground-truth dialogue state information; user utterance, modified dialogue state information, and ground-truth natural language response), training engine 116 may cause p-tuning model 114 to generate training output(s). Training engine 116 may then compare observed output(s) with the desired target output(s). The desired target output(s) may include human-annotated ground truths corresponding to the input. The resulting error or mismatch, e.g., the difference between the desired target output(s) and the actual output(s) of p-tuning model 114, may be back-propagated through p-tuning model 114, and the weights and biases in p-tuning model 114 may be adjusted to make the actual or predicted output(s) closer to the target (ground truth) output(s). This adjustment may be repeated until the output error for a given training input satisfies a predetermined condition (e.g., falls below a predetermined value). Subsequently, a different training input may be selected, a new output generated, and a new series of adjustments implemented, until p-tuning model 114 is trained to (e.g., converges to) a target degree of accuracy. Although training of p-tuning model 114 is described in the aforementioned example, similar operations may be performed in training of LLM 112.

Task-Oriented Assistant Response Generation

Figure 2:
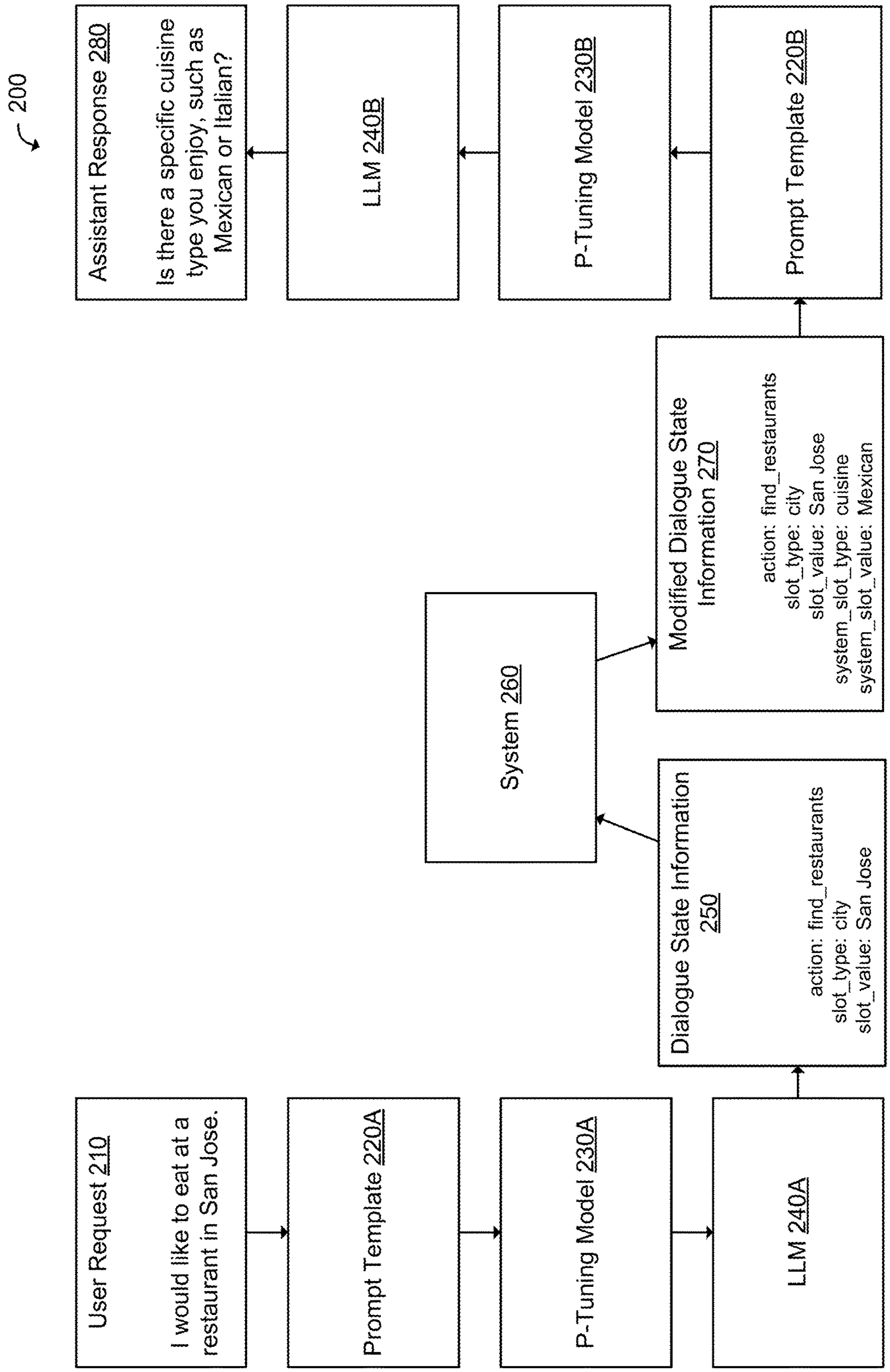
FIG. 2 illustrates an example data flow for generating a task-oriented assistant response based on a user input, according to at least one embodiment.

FIG. 2 illustrates an example data flow 200 for generating a task-oriented assistant response based on a user input, according to at least one embodiment. User request 210 may be combined with prompt template 220A to obtain a first prompt. For example, user request 210 may include the natural language request "I would like to eat at a restaurant in San Jose." Prompt template 220A may include one or more variable placeholders (e.g., for user request 210, for a list of available actions, for a list of possible slot types, etc.). In some embodiments, prompt template 220A may also include one or more example request-response pairs (e.g., an example user request with a corresponding LLM output). The generated prompt may be provided as an input to p-tuning model 230A. P-tuning model 230A may output a first set of tokens, which may be provided to LLM 240A. In some embodiments, user request 210 is also provided as an input to LLM 240A. The first set of tokens may include one or more words and or vector embeddings within an embedding or latent space.

LLM 240A may output dialogue state information 250 based on the first set of tokens (which, in turn, is based on user request 210). In some embodiments, dialogue state information 250 is a natural language output. In some embodiments, dialogue state information 250 is a structured output. Dialogue state information 250 may be in a machine-readable format (e.g., key-value pairs, JavaScript object notation (JSON), comma separated values (CSV), etc.). Dialogue state information 250 may include the action the user desires the task-oriented assistant to perform and one or more slot types and corresponding values.

Dialogue state information 250 may be provided to system 260, which may provide modified dialogue state information 270. System 260 may be a data access system, which may access data based on the identified action of dialogue state information 250 and the one or more slot types and corresponding values. In some embodiments, system 260 may add information to dialogue state information 250 to generate modified dialogue state information 270. For example, system 260 may add context to the natural language request or add additional information based on preferences of the user that made the request.

For example, dialogue state information 250 may include three fields: action, slot_type, and slot_value. In some embodiments, the values of the fields of dialogue state information 250 may be a representation of the intent of the natural language request of the user. Modified dialogue state information 270 may include the fields and field values from dialogue state information 250 and may include one or more additional fields and field values based on preferences of the user. In FIG. 2, as an example, modified dialogue state information 270 from system 260 includes the additional fields system_slot_type and system_slot_value. Dialogue state information 250 may encode that the user wants the task-oriented assistant to "find_restaurants" in the "city" "San Jose." Modified dialogue state information 270 may encode that the user wants the task-oriented assistant to "find_restaurants" in the "city" "San Jose" that have "Mexican" cuisine, because, for example, system 260 has data indicating that the user has a preference for Mexican cuisine.

Modified dialogue state information 270 may combined with prompt template 220B to obtain a second prompt. Prompt template 220B may include the identified action of the dialogue state information, the one or more slot types and corresponding values of the dialogue state information, and the one or more system slot types and corresponding values of the modified dialogue state information. In some embodiments, the second prompt may also include one or more example request-response pairs (e.g., an example system request with a corresponding LLM output). Prompt template 220B may include one or more variable placeholders (e.g., for modified dialogue state information 270 and/or field values of modified dialogue state information 270). The generated second prompt may be provided to p-tuning model 230B to obtain a second set of tokens. The second set of tokens may include one or more words and or vector embeddings within an embedding space. LLM 240B may receive the second set of tokens and may output assistant response 280, which may be a natural language response to user request 210.

Although the example depicted in FIG. 2 relates to finding a restaurant, the present disclosure is not limited to this task. The present disclosure may be used for any task that can be performed by a task-oriented assistant. For example, a user may request the task-oriented assistant (e.g., task-oriented assistant 110 of FIG. 1) to make a dinner reservation at a particular restaurant, look up a song, play media, search for events, reserve a hotel room, transfer money, get a weather forecast, and the like. In each situation, the user may make a natural language request, which may be converted to a first set of tokens and then to dialogue state information. The dialogue state information may encode the intent of the user's natural language request. An external system may modify the dialogue state information (e.g., by adding context, user preferences, etc.) to generate modified dialogue state information. The modified dialogue state information may be converted to a second set of tokens and then to a natural language task-oriented assistant response.

One or more datasets may be used to train p-tuning model 230A and/or p-tuning model 230B. During the training phase, weights of p-tuning model 230A and/or p-tuning model 230B may be updated to improve an accuracy (e.g., precision, recall, F1 score, rouge score, etc.) of the model. Weights of LLM 240A and/or LLM 240B may be frozen and may not be modified during the training phase. P-tuning model 230A and/or p-tuning model 230B may be trained using one or more training datasets. A first dataset (e.g., PRESTO) may include a plurality of entries, which each include user requests, corresponding dialogue state information values, and target LLM responses. One or more entries of the first dataset may also include one or more <user request, assistant response> pairs as context information for an entry. In some embodiments, such context information may be separated into individual entries in the dataset. A second dataset (e.g., Schema-Guided Dialogue (SGD)) may include a plurality of entries, which each include user requests, dialogue state information values, one or more slot types and corresponding slot values, and target LLM responses. One or more entries of the second dataset may also include one or more <user request, assistant response> pairs as context information for an entry. In some embodiments, such context information may be separated into individual entries in the dataset.

Training p-tuning model 230A using the first dataset may include generating a list of possible actions and slot types based on the first dataset. Training may further include retrieving from the first dataset a first entry. One or more values of the first entry (e.g., user request), the list of possible actions, and the list of possible slot types may be inserted into prompt template 220A. Prompt template 220A may include placeholder values for the user request (e.g., user utterance), the list of possible actions, and the list of possible slot types. In some embodiments, prompt template 220A also includes a placeholder for a first user request, a second user request, and a first assistant response. A first input prompt may be generated by replacing the placeholder values of prompt template 220A with the corresponding values from the first dataset and/or entry of the first dataset. The first input prompt may be provided to p-tuning model 230A to generate a first set of tokens that may be provided to LLM 240A. In some embodiments, the first input prompt is provided to LLM 240A along with the first set of tokens. LLM 240A may generate a first output that includes dialogue state information (e.g., dialogue state information 250). The first output may be compared to the ground truth dialogue state information contained in the first entry of the first dataset. The weights of p-tuning model 230A may be adjusted to better align the first output with the first ground truth.

Training p-tuning model 230B (which may be the same as p-tuning model 230A) using the second dataset may include retrieving from the second dataset a second entry. One or more values of the second entry (e.g., user request, action, slot type, slot value, etc.), the dialogue state information from the LLM output (e.g., dialogue state information 250), and one or more system slot types and corresponding slot values may be inserted into prompt template 220B. Prompt template 220B may include placeholder values for the user request; the action, slot type, and slot value from the dialogue state information; and one or more system slot types and corresponding slot values. In some embodiments, prompt template 220B also includes a placeholder for a first user request, a second user request, and a first assistant response. A second input prompt may be generated by replacing the placeholder values of prompt template 220B with the corresponding values from the entry of the second dataset. The second input prompt may be provided to p-tuning model 230B to generate a second set of tokens that may be provided to LLM 240B (which may be the same as LLM 240A). In some embodiments, the second input prompt is provided to LLM 240B along with the second set of tokens. LLM 240B may generate a second output (e.g., assistant response 280) that includes a natural language task-oriented assistant response, which responds to the user's request (e.g., user request 210). The second output may be compared to the ground truth task-oriented assistant response contained in the second entry of the second dataset. The weights of p-tuning model 230B may be adjusted to better align the second output with the ground truth.

In some embodiments, a single p-tuning model is used to convert the first input prompt into the first set of tokens for the LLM and to convert the second input prompt into the second set of tokens for the LLM. In some embodiments, a first p-tuning model is used to convert the first input prompt into the first set of tokens for the LLM, and a second p-tuning model is used to convert the second input prompt into the second set of tokens for the LLM. In some embodiments, a single LLM is used to generate dialogue state information and the natural language task-oriented assistant response. In some embodiments, a first LLM is used to generate dialogue state information, and a second LLM is used to generate the natural language task-oriented assistant response.

Figure 3A:
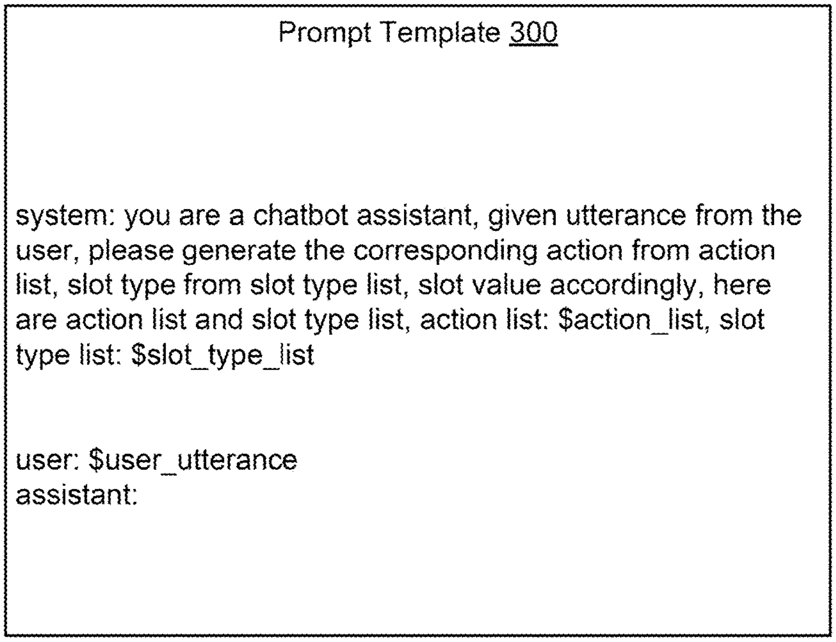
FIGS. 3A-B illustrate example prompt templates for generating machine learning model inputs, according to at least one embodiment.

FIG. 3A illustrates an example prompt template 300 for generating machine learning model inputs, according to at least one embodiment. Prompt template 300 may include static text and one or more variable placeholders. The static text may include natural language instructions for a machine learning model. For example, the static text may instruct a machine learning model (e.g., an instruction-following LLM) to generate text in a certain format and/or based on provided information. In some embodiments, prompt template 300 may include a variable placeholder for a list of actions that can be performed by the task-oriented assistant (e.g., $action_list), a variable placeholder for a list of slot types understood by the task-oriented assistant (e.g., $slot_type_list), and/or a variable placeholder for the user's natural language request (e.g., $user_utterance). In some embodiments, some variable placeholders (e.g., $action_list and $slot_type_list) are filled with the same values for a first request and a second request and some variable placeholders (e.g., $user_utterance) are different for each request. In some embodiments, all variable placeholders are filled with different values for each request. In some embodiments, some variable placeholders are filled during training and then are frozen during an inference stage, while some variable placeholders may continue to change during an inference stage. In some embodiments, prompt template 300 is used to generate a "zero-shot" style LLM input.

Figure 3B:
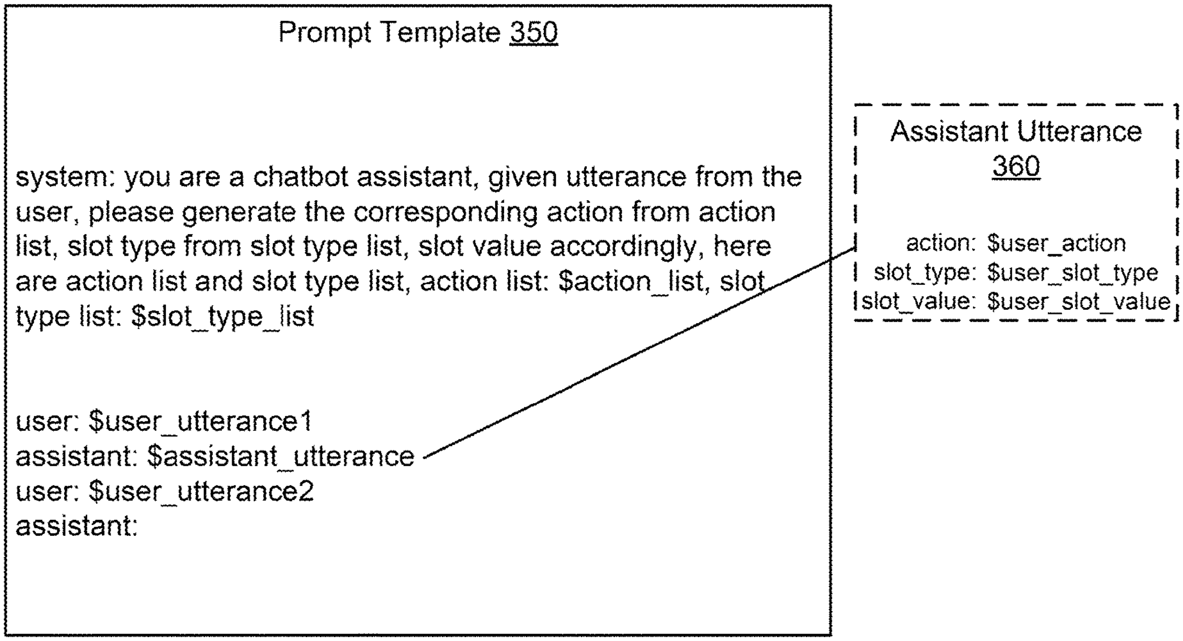

FIG. 3B illustrates an example prompt template 350 for generating machine learning model inputs, according to at least one embodiment. Prompt template 350 may include static text and one or more variable placeholders. The static text may include natural language instructions for a machine learning model. In some embodiments, prompt template 350 may include a variable placeholder for a list of actions that can be performed by the task-oriented assistant (e.g., $action_list), a variable placeholder for a list of slot types understood by the task-oriented assistant (e.g., $slot_type_list), one or more variable placeholders for example user's natural language requests (e.g., $user_utterance1), one or more variable placeholders for example LLM outputs corresponding to the example user's natural language requests (e.g., $assistant_utterance), and/or a variable placeholder for the user's natural language request (e.g., $user_utterance2). In some embodiments, some variable placeholders (e.g., $action_list and $slot_type_list) are filled with the same values for a first request and a second request and some variable placeholders (e.g., $user_utterance2) are different for each request. In some embodiments, all variable placeholders are filled with different values for each request. In some embodiments, some variable placeholders are filled during training and then are frozen during an inference stage, while some variable placeholders may continue to change during an inference stage. In some embodiments, prompt template 350 is used to generate a "one-shot" style LLM input or a "few-shot" style LLM input.

In some embodiments, one variable placeholder of prompt template 350 (e.g., $assistant_utterance) may be replaced by assistant utterance 360. Assistant utterance 360 may be an example LLM output based on a set of input tokens. In some embodiments, assistant utterance 360 includes an example LLM output that follows the instructions included in the static text of prompt template 350. For example, assistant utterance 360 may include structured text that includes one or more fields, such as "action," "slot type," and/or "slot_value." In some embodiments, assistant utterance 360 includes dialogue state information (e.g., dialogue state information 250 of FIG. 2). In some embodiments, assistant utterance 360 may include one or more variable placeholders that may be filled with different values during a training of a machine learning model. In some embodiments, during training, the values of variable placeholders of prompt template 350 may be changed at a rate different than the rate of the values of variable placeholders of assistant utterance 360 being changed. For example, the values of variable placeholders of prompt template 350 may change every round whereas the values of variable placeholders of assistant utterance 360 may change every N-th round.

In some embodiments, prompt template 300 (and/or prompt template 350) corresponds to prompt template 220A of FIG. 2. Prompt template 300 (and/or prompt template 350) may be used to generate prompts that are provided to a machine learning model (e.g., p-tuning model 230A of FIG. 2).

Figure 4A:
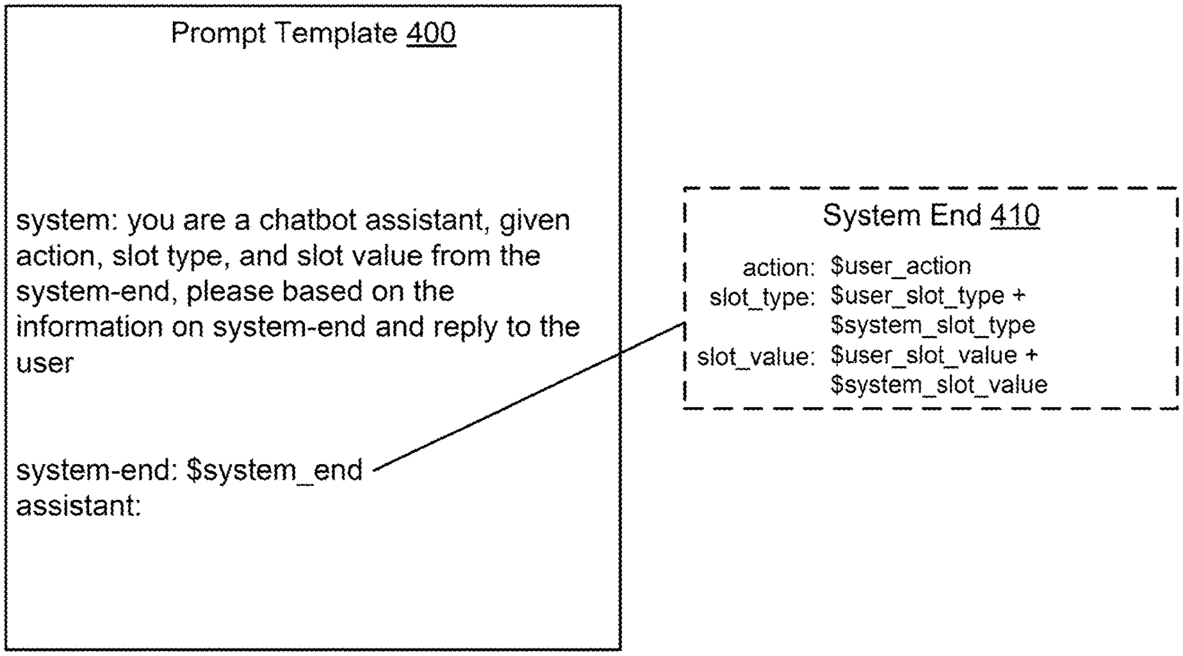
FIGS. 4A-B illustrate example prompt templates for generating machine learning model inputs, according to at least one embodiment.

FIG. 4A illustrates an example prompt template 400 for generating machine learning model inputs, according to at least one embodiment. Prompt template 400 may include static text and one or more variable placeholders. The static text may include natural language instructions for a machine learning model. For example, the static text may instruct a machine learning model (e.g., an instruction-following LLM) to generate text in a certain format and/or based on provided information. In some embodiments, prompt template 400 may include a variable placeholder for a system output (e.g., $system_end). For example, the variable placeholder for a system output may be filled by the output of system 260 of FIG. 2.

In some embodiments, the variable placeholder for a system output may be filled by system end 410. System end 410 may include structured text that includes one or more fields (e.g., action, slot_type, slot_value, system_slot_type, system_slot_value, etc.). In some embodiments, system end 410 includes modified dialogue state information (e.g., modified dialogue state information 270 of FIG. 2). In some embodiments, prompt template 400 is used to generate a "zero-shot" style LLM input.

Figure 4B:
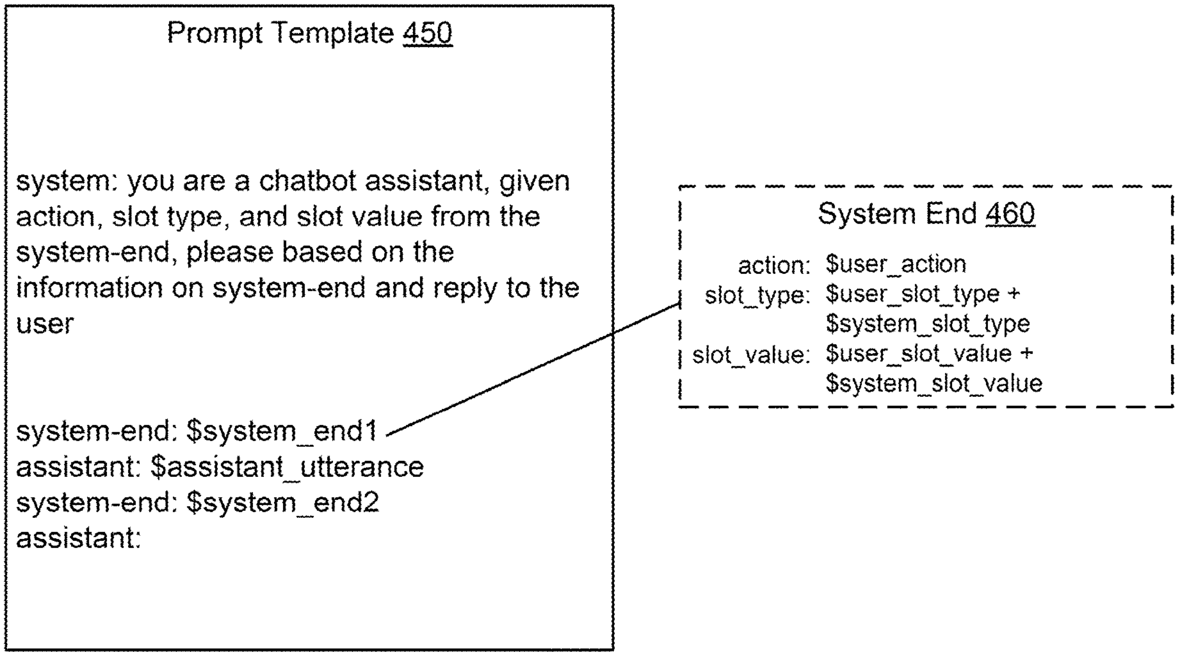

FIG. 4B illustrates an example prompt template 450 for generating machine learning model inputs, according to at least one embodiment. Prompt template 450 may include static text and one or more variable placeholders. The static text may include natural language instructions for a machine learning model. In some embodiments, prompt template 450 may include one or more variable placeholders for example system outputs (e.g., $system_end1), one or more variable placeholders for example LLM outputs corresponding to the example system outputs (e.g., $assistant_utterance), and/or a variable placeholder for a current system output (e.g., $system_end2). For example, the current system output may correspond to a modified dialogue state information. In some embodiments, some variable placeholders (e.g., $system_end1 and $assistant_utterance) are filled with the same values for a first request and a second request and some variable placeholders (e.g., $system_end2) are different for each request. In some embodiments, all variable placeholders are filled with different values for each request. In some embodiments, some variable placeholders are filled during training and then are frozen during an inference stage, while some variable placeholders may continue to change during an inference stage. In some embodiments, prompt template 450 is used to generate a "one-shot" style LLM input or a "few-shot" style LLM input.

In some embodiments, one variable placeholder of prompt template 450 (e.g., $assistant_utterance) may be replaced by an example task-oriented assistant natural language response. For example, $assistant_utterance may be replaced by an example LLM output based on a set of input tokens (e.g., generated by p-tuning model 230B in response to a prompt generated using prompt template 450). In some embodiments, during training, some of the values of variable placeholders of prompt template 450 may be changed at a rate different than the rate of the other values of variable placeholders of prompt template 450 being changed. For example, the values of some variable placeholders of prompt template 450 may change every round whereas the values of other variable placeholders of prompt template 450 may change every M-th round.

In some embodiments, prompt template 400 (and/or prompt template 450) corresponds to prompt template 220B of FIG. 2. Prompt template 400 (and/or prompt template 450) may be used to generate prompts that are provided to a machine learning model (e.g., p-tuning model 230B of FIG. 2).

Figure 5:
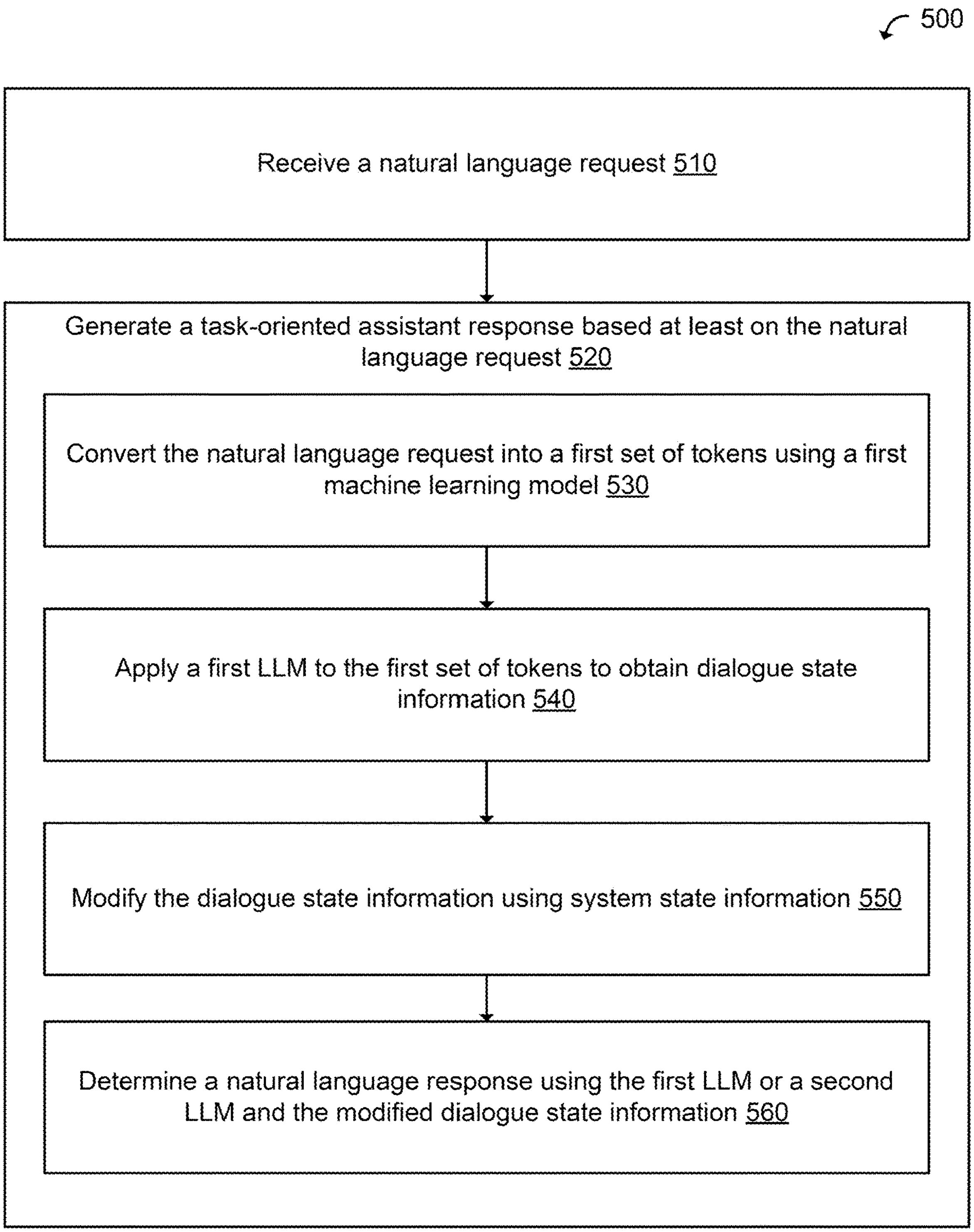
FIG. 5 is a flow diagram of an example method of generating a task-oriented assistant response based on a user input, according to at least one embodiment.
Figure 6:
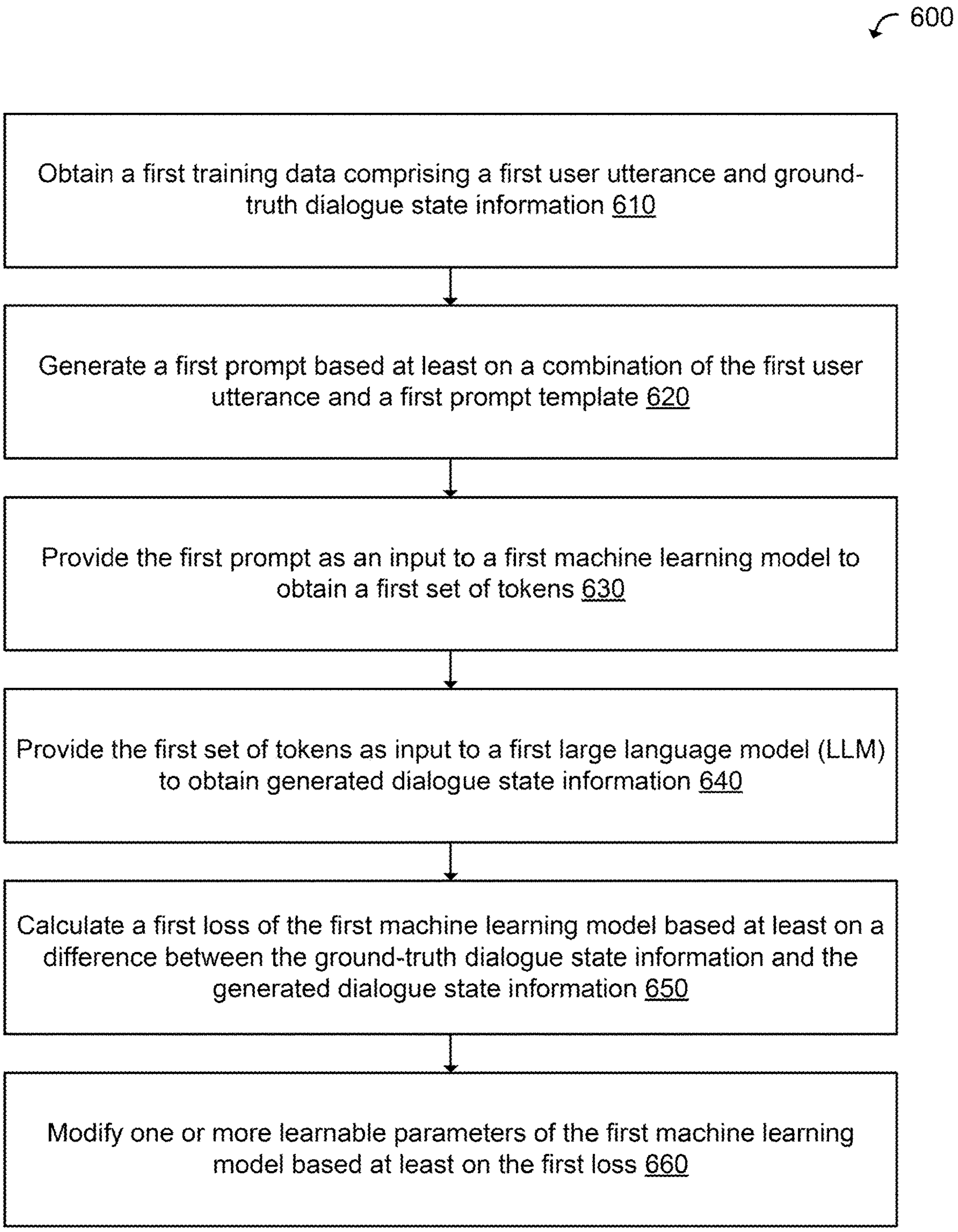
FIG. 6 is a flow diagram of an example method of training a machine learning model to guide an LLM to respond to user requests as a task-oriented assistant, according to at least one embodiment.

FIG. 5 is a flow diagram of an example method 500 of generating a task-oriented assistant response based on a user input, according to at least one embodiment. FIG. 6 is a flow diagram of an example method 600 of training a machine learning model to guide an LLM to respond to user requests as a task-oriented assistant, according to at least one embodiment. Methods 500 and 600 may be performed using one or more processing units (e.g., CPUs, GPUs, accelerators, physics processing units (PPUs), data processing units (DPUs), etc.), which may include (or communicate with) one or more memory devices. In at least one embodiment, methods 500 and 600 may be performed using a processing device. In at least one embodiment, methods 500 and 600 may be performed using processing units of task-oriented assistant 110 and/or user device 150 of FIG. 1. In at least one embodiment, processing units performing any of methods 500 and/or 600 may be executing instructions stored on a non-transient computer-readable storage media. In at least one embodiment, any of methods 500 and/or 600 may be performed using multiple processing threads (e.g., CPU threads and/or GPU threads), individual threads executing one or more individual functions, routines, subroutines, or operations of the method. In at least one embodiment, processing threads implementing any of methods 500 and/or 600 may be synchronized (e.g., using semaphores, critical sections, and/or other thread synchronization mechanisms). Alternatively, processing threads implementing any of methods 500 and/or 600 may be executed asynchronously with respect to each other. Various operations of any of methods 500 and/or 600 may be performed in a different order compared with the order shown in FIG. 5 and/or FIG. 6. Some operations of any of methods 500 and/or 600 may be performed concurrently with other operations. In at least one embodiment, one or more operations shown in FIG. 5 and/or FIG. 6 may not always be performed.

FIG. 5 is a flow diagram of an example method 500 of generating a task-oriented assistant response (e.g., assistant response 280 of FIG. 2) based on a user input (e.g., user request 210 of FIG. 2), according to at least one embodiment. At block 510, processing units executing method 500 may receive a natural language request (e.g., of a user). At block 520, processing units may generate a task-oriented assistant response based at least on the natural language request. To generate the task-oriented assistant response, processing units may, at block 530, convert the natural language request into a first set of tokens using a first machine learning model (e.g., p-tuning model 230A of FIG. 2). In some embodiments, to convert the natural language request into the first set of tokens processing units may generate a first prompt based on a combination of the natural language request and a first prompt template (e.g., prompt template 220A of FIG. 2). In some embodiments, the first prompt template includes a list of possible task-oriented assistant actions and/or a list of possible action parameter types. Processing units may further provide the first prompt to the first machine learning model to obtain the first set of tokens. In some embodiments, the first machine learning model includes a long short-term memory neural network and/or a recurrent neural network.

At block 540, processing units may apply a first LLM (e.g., LLM 240A of FIG. 2) to the first set of tokens to obtain dialogue state information. At block 550, processing units may modify the dialogue state information (e.g., dialogue state information 250 of FIG. 2) using system state information (e.g., to obtain modified dialogue state information 270 of FIG. 2). At block 560, processing units may determine a natural language response using the first LLM or a second LLM (e.g., LLM 240B of FIG. 2) and the modified dialogue state information. In some embodiments, processing units may cause presentation of the natural language response.

In some embodiments, to determine the natural language response processing units may apply a second machine learning model (e.g., p-tuning model 230B of FIG. 2) to the modified dialogue state information to obtain a second set of tokens. In some embodiments, to apply the second machine learning model to the modified dialogue state information processing units may generate a second prompt based on a combination of the modified dialogue state information and a second prompt template (e.g., prompt template 220B). Processing units may further provide the second prompt as an input to the second machine learning model to obtain the second set of tokens. Processing units may apply the first LLM or the second LLM to the second set of tokens to obtain the natural language response. In some embodiments, the first LLM and the second LLM are the same. In some embodiments, the first machine learning model and the second machine learning model are the same.

FIG. 6 is a flow diagram of an example method 600 of training a machine learning model to guide an LLM to respond to user requests as a task-oriented assistant, according to at least one embodiment. Processing units executing method 600 may, at block 610, obtain a first training data comprising a first user utterance and ground-truth dialogue state information. At block 620, processing units may generate a first prompt based on a combination of the first user utterance and a first prompt template. In some embodiments, the first prompt template includes a list of possible task-oriented assistant actions and/or a list of possible action parameter types. At block 630, processing units may provide the first prompt as an input to a first machine learning model to obtain a first set of tokens. In some embodiments, the first machine learning model includes a long short-term memory neural network and/or a recurrent neural network.

At block 640, processing units may provide the first set of tokens as input to a first large language model (LLM) to obtain generated dialogue state information. At block 650, processing units may calculate a first loss of the first machine learning model based on a difference between the ground-truth dialogue state information and the generated dialogue state information. At block 660, processing units may modify one or more learnable parameters of the first machine learning model based at least on the first loss.

In some embodiments, method 600 further includes training a second machine learning model. For example, processing units may obtain a second training data comprising a second user utterance, modified dialogue state information, and a ground-truth natural language response. Processing units may generate a second prompt based on a combination of the second user utterance, the modified dialogue state information, and a second prompt template. Processing units may provide the second prompt as input to a second machine learning model to obtain a second set of tokens. Processing units may provide the second set of tokens as input to a second LLM to obtain a generated natural language response. Processing units may calculate a second loss of the second machine learning model based on a difference between the ground-truth natural language response and the generated natural language response. Processing units may modify one or more learnable parameters of the second machine learning model based at least on the second loss. In some embodiments, the first machine learning model and the second machine learning model are the same. In some embodiments, the first LLM and the second LLM are the same.

The systems and methods described herein may be used for a variety of purposes, by way of example and without limitation, for performing one or more operations with respect to systems or methods associated with machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence (AI), chat bots, digital avatars, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for generating or presenting virtual reality content, mixed reality content, or augmented reality content, systems for performing conversational AI operations, systems for performing light transport simulation, systems for performing collaborative content creation for 3D assets, systems implemented at least partially using cloud computing resources, and/or other types of systems.

Inference and Training Logic

Figure 7A:
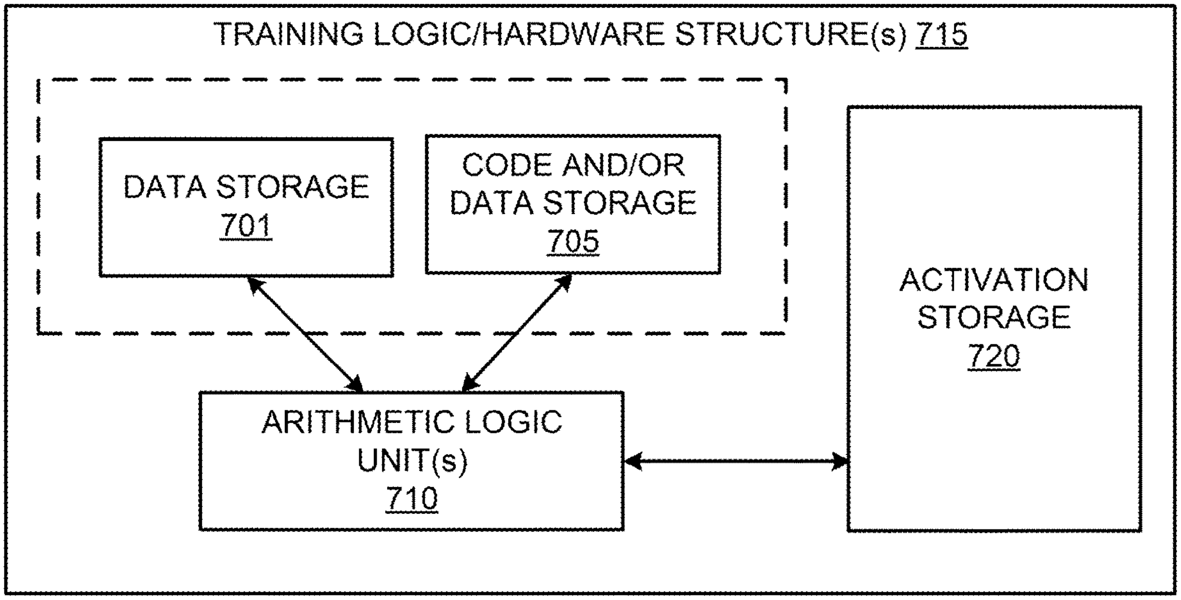
FIG. 7A illustrates inference and/or training logic, according to at least one embodiment of the present disclosure.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include (or be coupled to code and/or data storage 701 that stores) graph code or other software to control timing and/or order, in which weight and/or other parameter information is to be loaded to configure processing units, including logic units, integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include (or be coupled to code and/or data storage 705 that stores) graph code or other software to control timing and/or order, in which weight and/or other parameter information is to be loaded to configure processing units, including logic units, integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within the same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
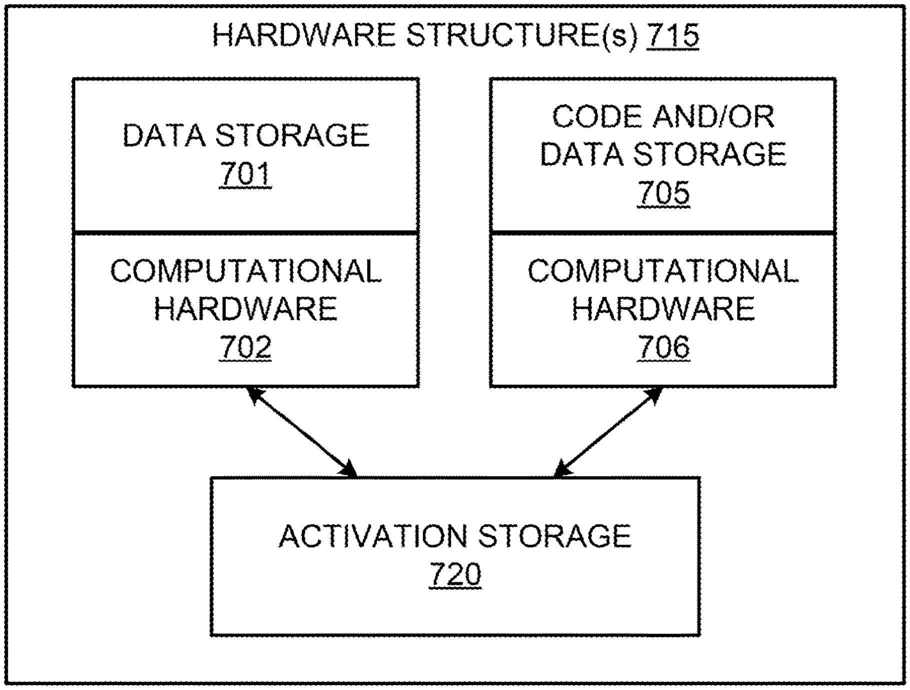
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, the result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
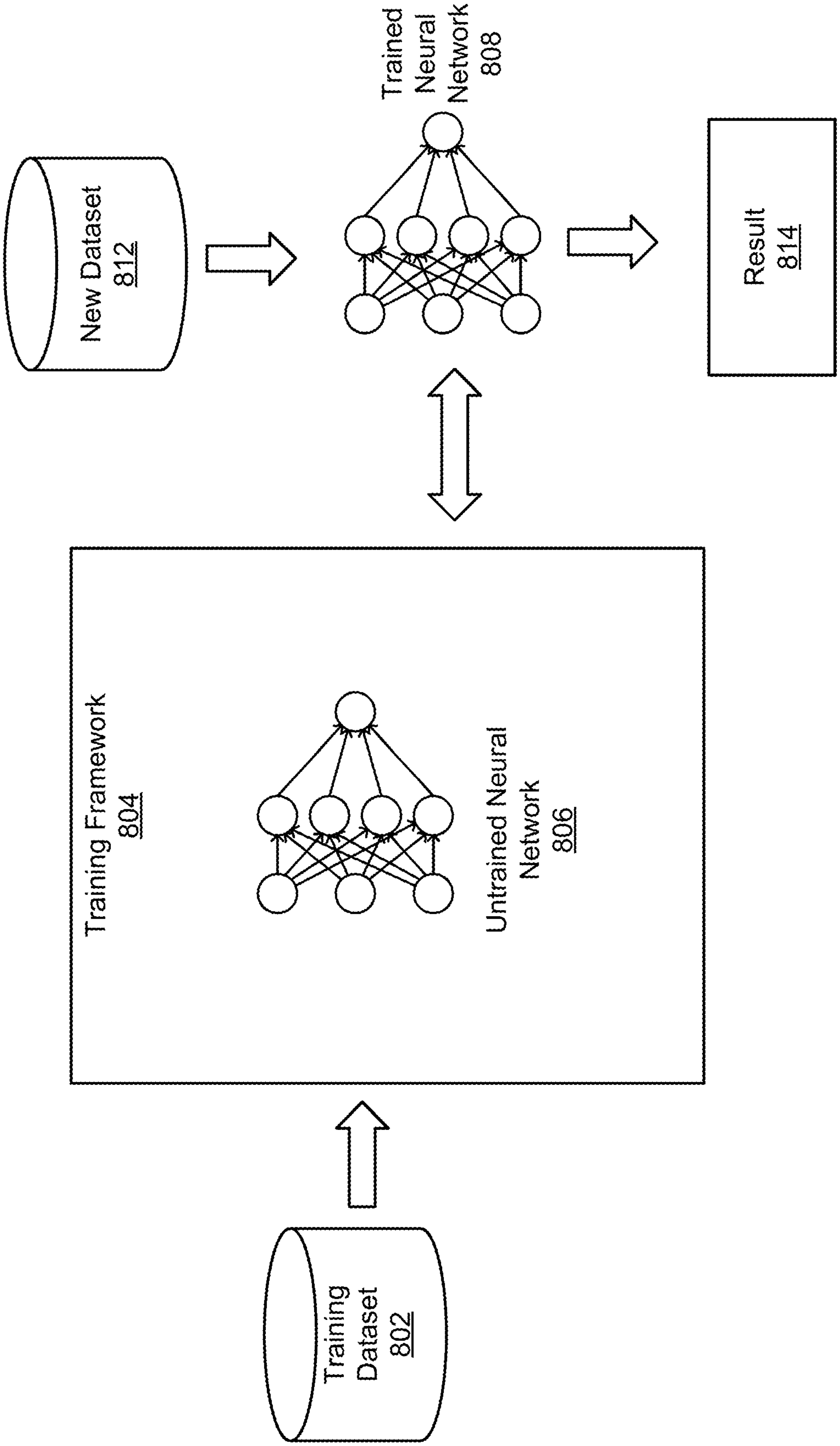
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
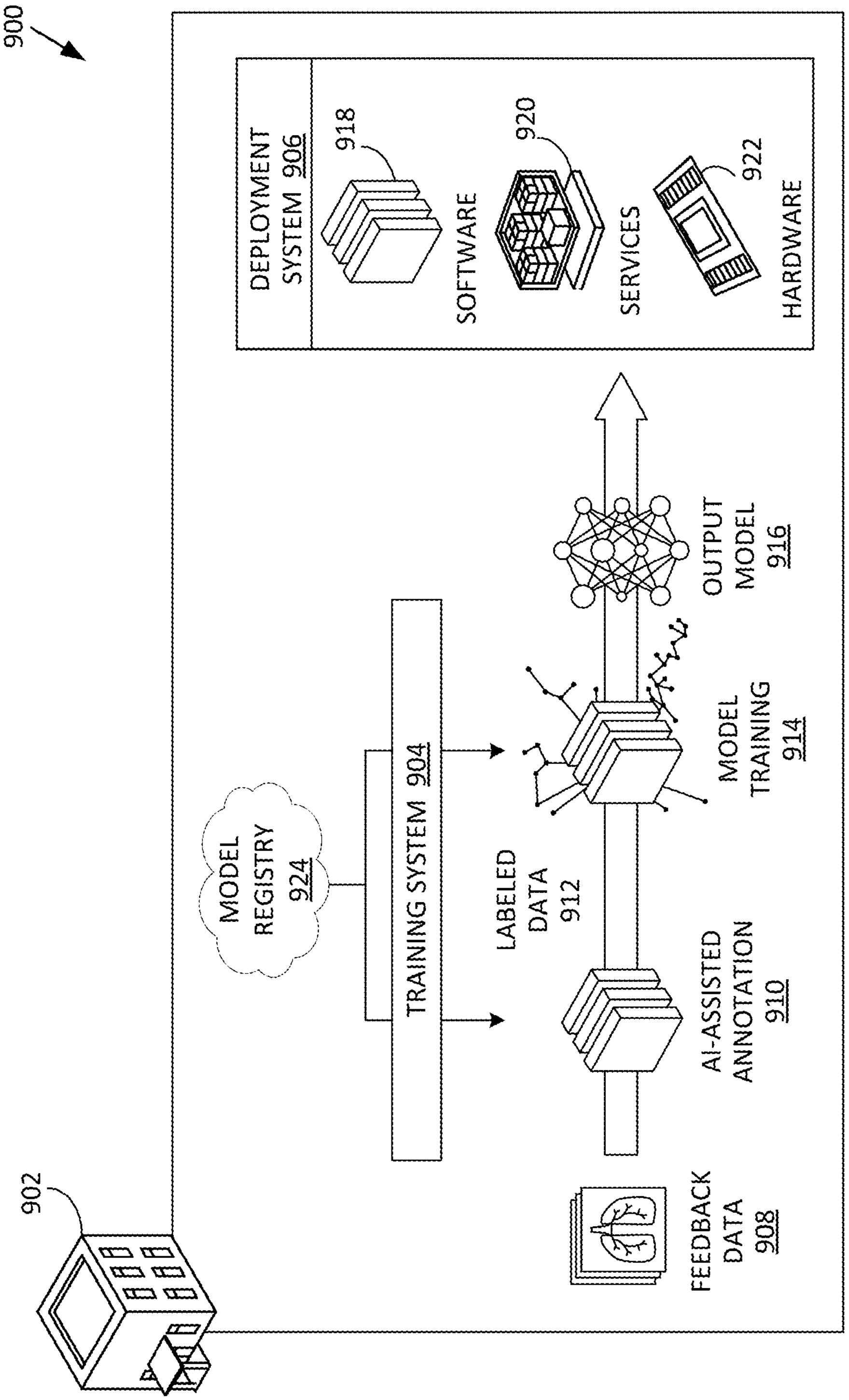
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914 may include data—e.g., AI-assisted annotations 910, labeled data 912, or a combination thereof—that may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
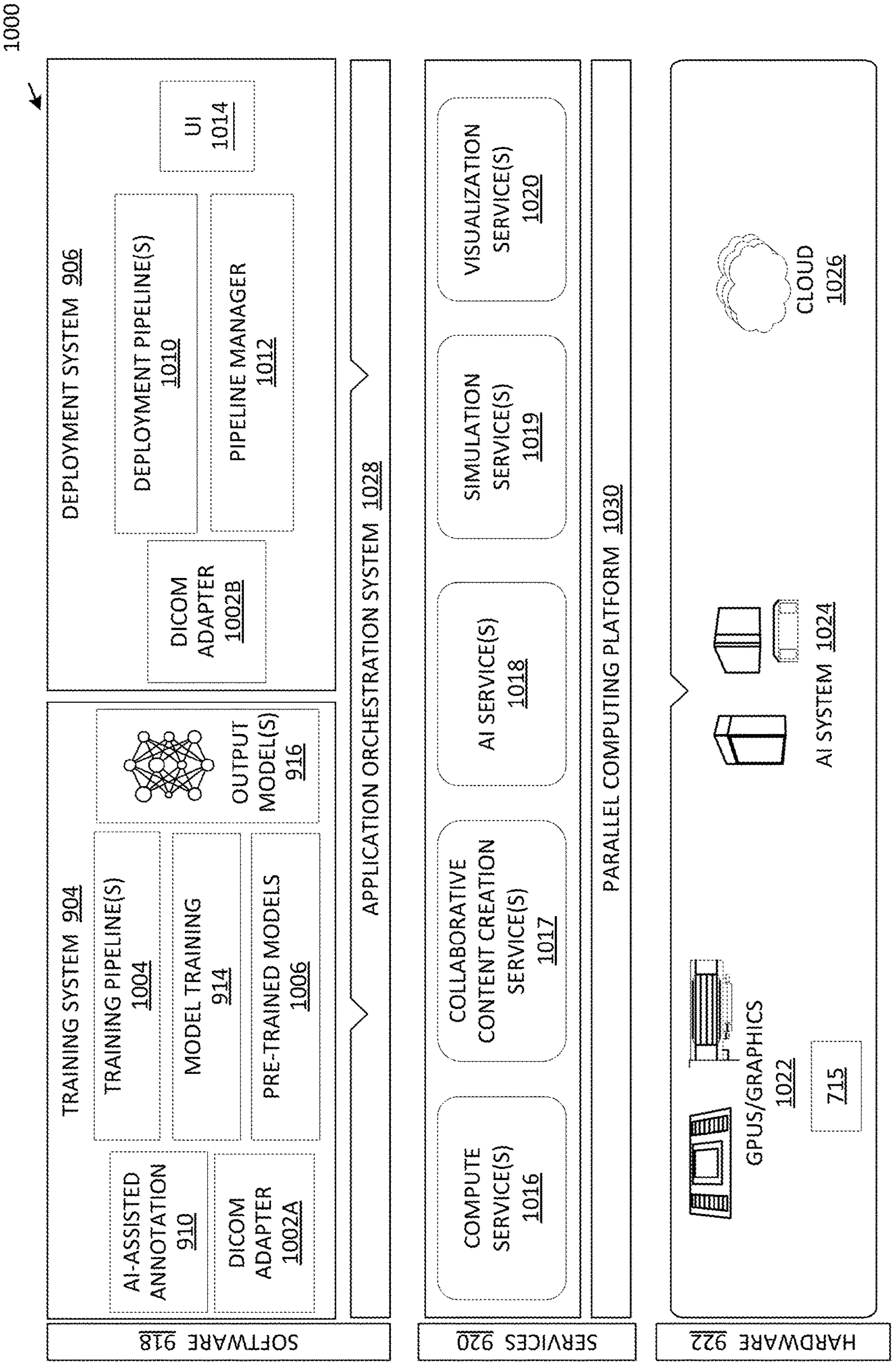
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may be implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (e.g., Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904 and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of the applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure an appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel-level segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA® and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two but can be more when so indicated either explicitly or by context. Further, unless stated otherwise or otherwise clear from context, the phrase "based on" means "based at least in part on" or "based at least on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, in some embodiments, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

receiving a natural language request; and generating a task-oriented assistant response based at least on the natural language request, the generating comprising:

converting the natural language request into a first set of tokens using a first machine learning model, the first set of tokens comprising vector embeddings within an embedding space;

applying a first large language model (LLM) to the first set of tokens to obtain dialogue state information, weights of the first LLM being frozen during generation thereof;

modifying the dialogue state information using system state information; and determining a natural language response using the first LLM or a second LLM and the modified dialogue state information, the natural language response corresponding to the task-oriented assistant response and being obtained by providing, to the first LLM or the second LLM, a second set of tokens generated by at least one machine learning model from the modified dialogue state information, the at least one machine learning model being trained independently of the first LLM.

2. The method of claim 1, wherein the at least one machine learning model comprises the first machine learning model and a second machine learning model.

3. The method of claim 2, wherein the first machine learning model and the second machine learning model are the same.

4. The method of claim 1, wherein the converting the natural language request into the first set of tokens comprises:

generating a first prompt based at least on a combination of the natural language request and a first prompt template; and providing the first prompt to the first machine learning model to obtain the first set of tokens.

5. The method of claim 2, wherein the applying the second machine learning model to the modified dialogue state information comprises:

generating a second prompt based on a combination of the modified dialogue state information and a second prompt template; and providing the second prompt as an input to the second machine learning model to obtain the second set of tokens.

6. The method of claim 1, wherein the first machine learning model comprises one of:

a long short-term memory neural network; or a recurrent neural network.

7. The method of claim 4, wherein the first prompt template comprises:

a list of possible task-oriented assistant actions; and a list of possible action parameter types.

8. A method comprising:

receiving a natural language request of a user; and generating a task-oriented assistant response based at least on the natural language request using a deployed machine learning model, wherein the deployed machine learning model is trained, at least in part, by:

obtaining a first training data comprising a first user utterance and ground-truth dialogue state information;

generating a first prompt based at least on a combination of the first user utterance and a first prompt template;

providing the first prompt as an input to a first machine learning model to obtain a first set of tokens, the first set of tokens comprising vector embeddings within an embedding space;

providing the first set of tokens as input to a first large language model (LLM) to obtain generated dialogue state information, weights of the first LLM being frozen during generation of the dialogue state information;

calculating a first loss of the first machine learning model based at least on a difference between the ground-truth dialogue state information and the generated dialogue state information;

modifying one or more learnable parameters of the first machine learning model based at least on the first loss;

obtaining a second training data comprising a second user utterance, modified dialogue state information, and a ground-truth natural language response;

generating a second prompt based at least on a combination of the second user utterance, the modified dialogue state information, and a second prompt template;

providing the second prompt as input to a second machine learning model to obtain a second set of tokens;

providing the second set of tokens as input to a second LLM to obtain a generated natural language response;

calculating a second loss of the second machine learning model based at least on a difference between the ground-truth natural language response and the generated natural language response; and modifying one or more learnable parameters of the second machine learning model based at least on the second loss.

9. The method of claim 8, wherein the first machine learning model comprises one of:

a long short-term memory neural network; or a recurrent neural network.

10. The method of claim 8, wherein the first prompt template comprises:

a list of possible task-oriented assistant actions; and a list of possible action parameter types.

11. The method of claim 8, wherein the first machine learning model and the second machine learning model are the same.

12. The method of claim 8, wherein the first LLM and the second LLM are the same.

13. A system comprising:

one or more processors to:

convert, using a first machine learning model, a natural language request into a first tokenized representation of the natural language request, the first tokenized representation comprising vector embeddings within an embedding space;

apply a large language model (LLM) to the first tokenized representation to obtain dialogue state information;

modify the dialogue state information using system state information to determine modified dialogue state information;

determine a natural language response using the LLM and the modified dialogue state information, weights of the LLM being frozen during determination of the natural language response, the natural language response being obtained by providing, to the LLM, a second tokenized representation generated by at least one machine learning model from the modified dialogue state information, the at least one machine learning model being trained independently of the LLM; and cause presentation of the natural language response.

14. The system of claim 13, wherein the at least one machine learning model comprises the first machine learning model and a second machine learning model.

15. The system of claim 14, wherein the first machine learning model and the second machine learning model are the same.

16. The system of claim 13, wherein to convert the natural language request into the first tokenized representation of the natural language request the one or more processors are to:

generate a first prompt based at least on a combination of the natural language request and a first prompt template; and provide the first prompt to the first machine learning model to obtain the first tokenized representation.

17. The system of claim 14, wherein to apply the second machine learning model to the modified dialogue state information the one or more processors are to:

generate a second prompt based at least on a combination of the modified dialogue state information and a second prompt template; and provide the second prompt as an input to the second machine learning model to obtain the second tokenized representation.

18. The system of claim 13, wherein the first machine learning model comprises one of:

a long short-term memory neural network; or a recurrent neural network.

19. The system of claim 13, wherein the system is comprised in at least one of:

an in-vehicle infotainment system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, mixed reality content, or augmented reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *